Nov. 10, 1931.                A. ROSENTHAL                1,831,367
                                BELT PULLEY
                            Filed April 22, 1929

Inventor
August Rosenthal

Patented Nov. 10, 1931

1,831,367

UNITED STATES PATENT OFFICE

AUGUST ROSENTHAL, OF WEST ALLIS, WISCONSIN, ASSIGNOR TO ROSENTHAL CORN HUSKER CO., OF WEST ALLIS, WISCONSIN

BELT PULLEY

Application filed April 22, 1929. Serial No. 357,120.

This invention relates to belt pulleys, and has primarily for its object to provide a simple and inexpensive pulley structure which avoids slippage of the belt, thus increasing pulling efficiency without additional drag, and which will cause the belt to properly track upon the pulley.

To attain the foregoing end, a more specific object is to provide the face of a pulley with transversely and laterally spaced grooves, the result of which produces a multiplicity of closely positioned projections which serve to provide the desired engagement between the belt and pulley to prevent either lateral or transverse slippage, without detriment or undue wear upon the belt.

A still further object resides in providing the surface of a pulley with opposed helical grooves, which counteract one another to cause the belt to properly track upon the pulley.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 1:
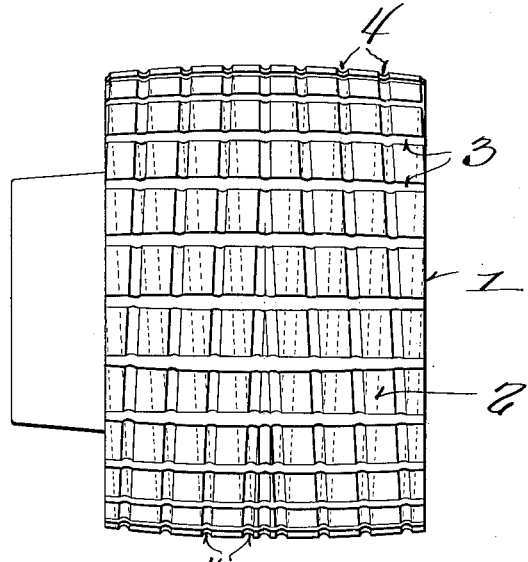
Figure 2:
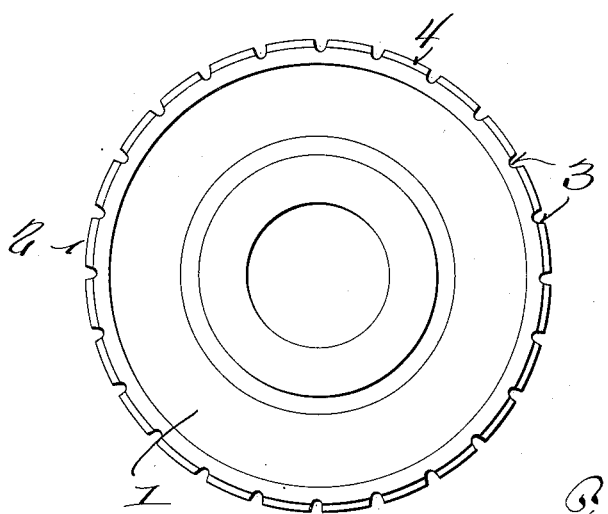

In the drawings, Figure 1 is a front elevation of a pulley constructed in accordance with the present invention, and Figure 2 is a side elevation of the same.

Referring now more particularly to the accompanying drawings, the numeral 1 designates a conventional type of belt pulley provided with an extended face 2. While the drawings illustrate the face of the pulley as slightly crowned, it is to be understood that the invention is equally applicable to a flat faced pulley.

In carrying out the invention, the face 2 of the pulley is provided with a plurality of spaced transverse grooves 3, which may be of any desired contour at their bottom, although for manufacturing purposes, the rounded grooves illustrated are preferred.

Obviously, the spaced grooves result in a plurality of transverse webs, the forward edges of which engage the belt to prevent slippage, and thus increase the pulling efficiency without increasing the load resulting from undue drag, as the grooves extend entirely across the face of the pulley and, therefore, serve as vents to break any tendency towards suction or adherence between the belt and pulley face.

It will also be appreciated that the comparatively narrow width of the grooves 3 will not sufficiently interrupt the face of the pulley, as to result in pounding or damage to the belt.

While it will be understood that any arrangement of spaced annular grooves may serve to cause the belt to properly track upon the pulley, it has been found, by actual practice, that the opposed helical grooves 4 are most desirable, in that the edges of each groove oppose the edges of the adjacent groove to cause a slight pull upon the belt at all times, which is neutralized in both directions and causes the belt to properly track upon the pulley.

Obviously, the amount of pull required to insure proper tracking need be very slight and, therefore, the helical grooves 4 are preferably of less depth than the transverse grooves 3. Inasmuch as the helical grooves communicates with the transverse grooves, they are vented throughout their length, which further avoids suction, resulting in unnecessary drag, and damage to the belt due to overheating.

From the foregoing description, taken in connection with the accompanying drawings, it will be readily apparent that a very simple, inexpensive, and efficient belt pulley has been provided, which in ordinary use will entirely eliminate possible slippage, and insures proper tracking of the belt upon the pulley.

I claim:

1. A belt pulley having its face provided with spaced transverse grooves and opposed annular helical grooves.

2. A belt pulley having its face provided with spaced transverse grooves and opposed annular helical grooves converging at the center line of the pulley.

3. A belt pulley having its face provided with annularly and transversely spaced grooves, the transverse grooves being of greater depth than the annular grooves, and open at the edges of the pulley.

4. A belt pulley having its face provided with spaced transverse grooves and opposed annular helical grooves, the transverse grooves being of greater depth than the annular helical grooves.

5. A belt pulley having its face provided with spaced transverse grooves, and opposed annular helical grooves converging in a central annular groove entirely surrounding the face of the pulley.

6. A metallic belt pulley having its face provided with opposed oblique grooves converging centrally of the pulley face, and spaced transverse grooves extending across the entire face of the pulley.

7. A metallic belt pulley having its face provided with spaced transverse grooves, and opposed annular helical grooves intersecting said transverse grooves and converging in a central annular groove entirely surrounding the face of said pulley, the spacing of said transverse and helical grooves being substantially equal.

8. A metallic belt pulley having its face provided with spaced transverse grooves, and opposed helical grooves intersecting said transverse grooves and converging in a central annular groove entirely surrounding the face of said pulley, said helical grooves converging in a direction opposite to rotation of the pulley and the spacing of said transverse and helical grooves being substantially equal.

In testimony that I claim the foregoing I have hereunto set my hand at West Allis, in the county of Milwaukee and State of Wisconsin.

AUGUST ROSENTHAL.